UNITED STATES PATENT OFFICE.

ALBERT G. STEPHENS, OF COLORADO SPRINGS, COLORADO, ASSIGNOR OF ONE-HALF TO WILLIAM WHELAN, OF SAME PLACE.

COMPOSITION FOR EXTRACTING GOLD FROM REFRACTORY ORES.

SPECIFICATION forming part of Letters Patent No. 602,526, dated April 19, 1898.

Application filed June 30, 1897. Serial No. 643,041. (No specimens.)

*To all whom it may concern:*

Be it known that I, ALBERT G. STEPHENS, a citizen of the United States, residing at Colorado Springs, in the county of El Paso and State of Colorado, have invented a new and useful Composition of Matter to be Used to Extract Gold from Refractory Ores, of which the following is a specification.

My composition consists of the following ingredients, combined in the proportions stated, viz: pure water, five hundred gallons; chlorid of lime, five hundred pounds; bromid of potassium, five hundred ounces; nitric acid, fifteen and five-eighths gallons; muriatic acid, thirty-one and one-fourth gallons. These ingredients are to be thoroughly mingled by agitation.

The ore to be treated by the above-named compound should be crushed fine enough to pass through a sixty-mesh screen and placed in a receptacle with the compound over it. The ore and compound are then thoroughly mingled by agitation for from five minutes to one hour, according to the character of the ore being treated. The compound dissolves the gold and takes it up in solution, forming a chlorid of gold. The sediment is removed from the composition by any suitable process of filtration, and the chlorid of gold is precipitated and the gold removed therefrom in bulk by the ordinary method of treating gold chlorids to free the gold therefrom.

By the use of this composition ninety-nine per centum of the gold in refractory ore can be extracted and saved, and the same composition can be used over and over again with only slight loss, thus making a very cheap, economical, and valuable composition for treating refractory gold ores.

I am aware that nitric and muriatic acids have been used to dissolve gold and that chlorid of lime with other chemicals has been used for the same purpose; but I am not aware that all the ingredients of my composition in the proportions stated have been used together.

What I claim, and desire to secure by Letters Patent of the United States, is—

The herein-described composition to be used to extract gold from refractory ore, causing the gold in the ore to form a chlorid of gold from which the gold in bullion can be readily and economically obtained by any suitable means, consisting of water, five hundred gallons; chlorid of lime, five hundred 55 pounds; bromid of potassium, five hundred ounces; nitric acid, fifteen and five-eighths gallons; muriatic acid, thirty-one and one-fourth gallons, as herein specified.

ALBERT G. STEPHENS.

Witnesses:
   HUBBELL PEPPER,
   SCOTT NEWCOMER.